Sept. 19, 1939.        H. S. JANDUS        2,173,255
FRICTION BRAKE LEVER
Filed July 22, 1938        2 Sheets-Sheet 1
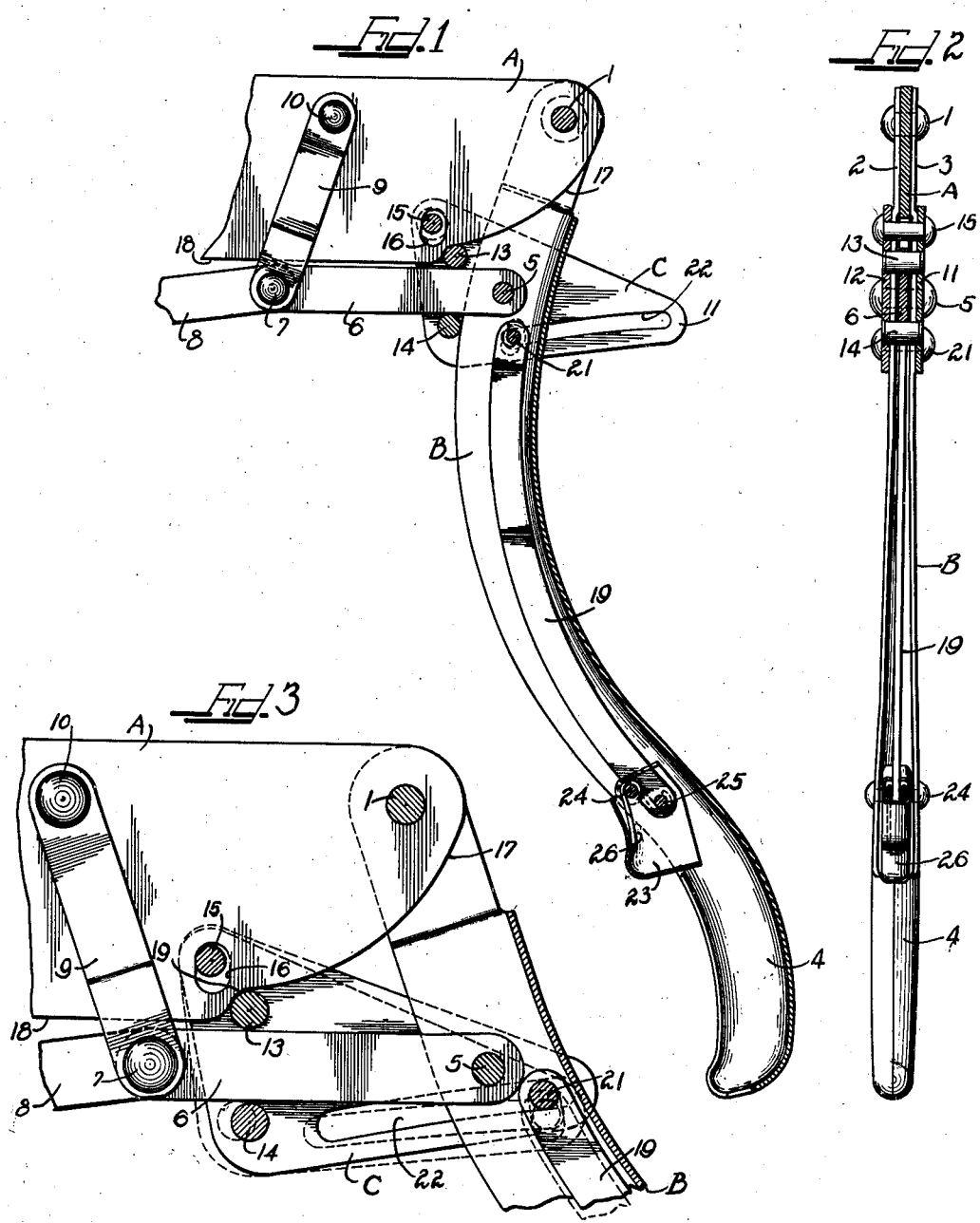
Inventor
HERBERT S. JANDUS

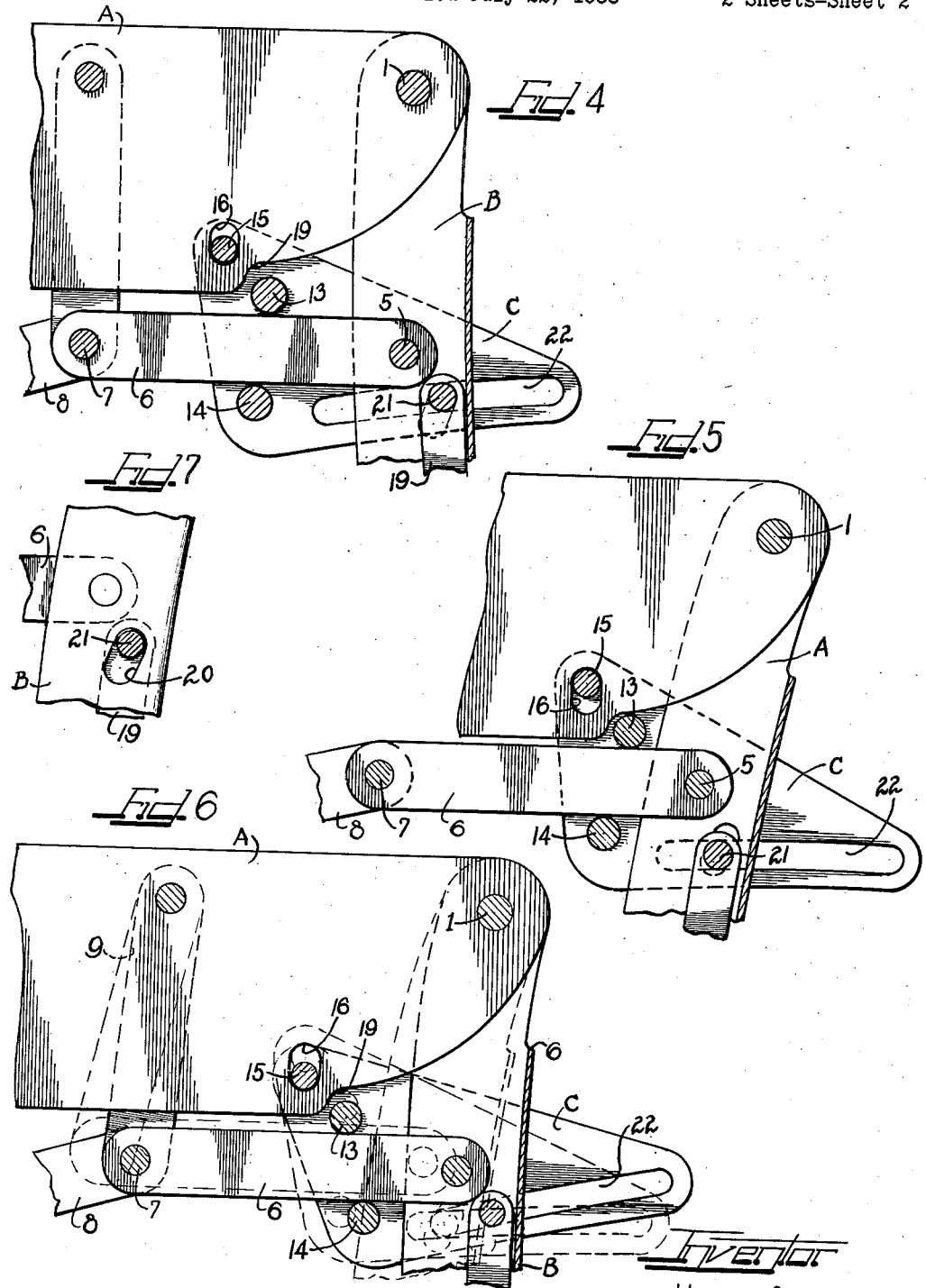

Patented Sept. 19, 1939

2,173,255

UNITED STATES PATENT OFFICE 2,173,255

FRICTION BRAKE LEVER

Herbert S. Jandus, Detroit, Mich., assignor to Houdaille-Hershey Corporation, Detroit, Mich., a corporation of Michigan Application July 22, 1938, Serial No. 220,617

8 Claims. (Cl. 74—531)

The present invention relates to friction brake lever and more particularly to an emergency brake lever for automotive vehicles.

The lever of the present invention employs a "canted link" idea in which the link is held suspended by the brake lever bracket free of attachment to the lever. The gripping action is applied to a bar or link pivoted at one end to the lever and connected at the other end to the brake mechanism, the canted link carrying shoes engaging opposite edges of the bar or link to hold the same in adjusted position.

An object of the present invention is to provide a novel friction brake lever embodying the canted link idea in which the link is suspended from the lever bracket in unbalanced relation.

Another object of the present invention is to provide a brake lever construction including a canted link in the nature of a tiltable plate structure having abutments for frictionally engaging opposite edges of a brake bar or link to hold the lever in adjusted position.

A further object of the present invention is to provide a friction brake lever in which the holding action is applied directly to a bar or link which connects the brake mechanism to the lever.

A still further object of the present invention is to provide a friction brake arrangement in which a plate structure is loosely suspended from the fulcrum bracket and which structure has parts for frictionally engaging opposite edges of a bar which connects the brake mechanism to the lever, to constitute means for holding the lever in adjusted position as the lever tends to move in the direction of brake pull.

The invention has for a further object the provision of a friction brake lever which may be released without applying back pull to the lever member.

The invention has for another object the provision of a friction brake lever having positive holding engagement under brake pull.

Generally speaking, the invention contemplates a brake lever construction in which the brake mechanism is connected to the lever member by means of a link or bar, in which a canted link in the nature of a plate structure is loosely suspended from the attaching bracket to which the lever is pivoted, which plate structure is in unstable position tending gravitally to swing in a direction to make frictional holding engagement with the link or bar, together with abutments between the bracket and plate structure to cause it to rock into holding engagement with the link or bar under brake pull.

The above, other and further objects of the present invention will be apparent from the following description and accompanying drawings.

The accompanying drawings illustrate an embodiment of the present invention and the views thereof are as follows:

Figure 1 is a view, partially is side elevation and partially in section, showing the preferred construction of the present lever, with the parts in the positions occupied when the lever member is in fully "off" position;

Figure 2 is an edge elevational view of the lever of Figure 1, with certain parts in section;

Figure 3 is an enlarged fragmental view of the fulcrum end of the lever member, showing in full lines the position of the plate structure when it is held out of frictional engagement with the bar or link by the release member carried by the lever member, and in dotted lines the position of the parts when the plate structure is in holding engagement with the bar or link;

Figure 4 is a view of the arrangement of parts in an intermediate position of the lever member between fully "off" position and fully "set" position with the structure canted by the release member out of holding engagement with the link;

Figure 5 is a view similar to Figure 4, showing a modification in which the bar or link connected with the brake mechanism is unsupported at its point of connection with the brake mechanism, and showing the parts of the lever member in "off" position;

Figure 6 is a view showing in full lines the positions of the parts as the lever member has been moved to its limit of movement in "off" position and with the release trigger still depressed, and showing in dotted lines the position of the parts after finger pressure has been removed from the trigger;

Figure 7 is a fragmental elevational view of a portion of the lever member showing the position of a pin which operatively connects the release member to the plate structure for releasing the holding engagement with the bar or link, with the pin in the uppermost position of its slot.

The drawings will now be explained.

An attaching bracket A, adapted to be secured behind the instrument board of an automotive vehicle, the attaching portion not being shown, has pivoted to it at I spaced legs 2 and 3 of a lever member, designated generally at B. The lever member is fashioned from flat stock into a substantially U-shaped configuration in cross section for a major portion of its length, with a hollow, closed grip portion 4 at its lower end.

Pivoted to the lever member B at 5 is one end of a link or bar 6, the other end of which is pivoted at 7 to a member 8 constituting a part of the brake mechanism.

To support the bar or link 6 for movement in horizontal direction, a hanger 9 is connected at one end to the pivot 7 and at the other end is pivoted at 10 to the attaching bracket or plate A with the distance from the axis of the pin 10 to the pin 7 the same as the distance from the axis of the pivot 1 to the pivot 5, so that as the lever member B is swung the link or bar 6 will maintain a horizontal position, regardless of the direction of pull of the member 8.

A plate structure, designated generally as C, is formed of two similar plates 11 and 12 of substantially triangular outline in elevation, and astraddle the lever member B. The plate structure C is provided with shoes 13 and 14 arranged to overlie and underlie, respectively, opposite edges of the link or bar 6 and to frictionally engage these edges of the bar or link with holding engagement as the lever member B tends to move in the direction of brake pull, that is, tends to move in clockwise direction. The shoes 13 and 14 are illustrated as studs securely fastened to the plates 11 and 12.

The plate structure C is loosely suspended from the attaching bracket A by means of a pin 15 secured to the plates 11 and 12 and passing through an elongated slot 16 in the bracket A.

The margin of the bracket A, adjacent the pivotal connection thereto of the lever member B, is curved as at 17 towards the bottom edge portion 18 of the bracket.

Adjacent the juncture of the curved edge 17 and the lower edge 18, the bracket A is notched or recessed at 19, as shown in the drawings.

The position of the notch or recess 19 is such that the upper shoe or abutment 13, of the plate sturcture C, is retained adjacent the notch so that irrespective of the tilted position of the plate structure, under brake pull, the plate structure will be caused to rock about the point of engagement between the shoe 13 and the notch or recess 19 as the lever member tends to move under brake pull, thereby tilting the plate structure into frictional holding engagement with the bar or link 6.

It will be observed from the drawings that the suspension of the plate structure C on the attaching bracket A is unstable and is such as to gravitally cause the plate structure to swing in clockwise direction, that is to say, to swing in a direction to normally engage the link or bar 6 with holding action.

It will be observed that the normal tendency of the plate structure C to swing in clockwise direction will cause engagement of the shoe 13 with the notch 19 of the bracket A, at all times, and thus tend to maintain the pin 15 in the upper end of the slot 16 in the bracket A so as to assure holding engagement of the plate structure with the link or bar 6.

The utilization of the hanger 9 serves to maintain movement of the link or bar 6 in horizontal direction which aids in holding engagement of the plate structure with the bar or link 6.

The lever member B is provided with a releasing member 19, shown as a metal bar bent lengthwise to conform to the curvature of the shaft of the lever member B and to operate within the side walls of the lever member. The side walls of the lever member B are slotted at 20 to receive a pin 21 which passes through the upper end of the releasing member 19 and also engages elongated slots 22 formed in the plates 11 and 12 of the plate structure C. The elongated slots 22 are described on a slight arc to allow movement of the pin 21 lengthwise of the plate structure C as the lever member is swung in use.

For actuating the releasing member 19 to disengage the plate structure C from holding engagement with the link or bar 6, a trigger 23 is pivoted at 24 to the side walls of the lever shaft adjacent the grip 4, with the trigger working in the slot defined by the side walls of the lever member. The lower end of the releasing member 19 is pivoted at 25 to the trigger 23 for moving the releasing member 19 endwise upwardly whenever the trigger 23 is depressed, that is, moved into the hollow portion of the lever member by actuation of the forefinger of the vehicle operator.

In order to maintain the trigger 23 closed and the releasing member 19 in normal or inoperative position, spring means are utilized.

The spring means herein illustrated includes a wire looped about the pivot 24 and having its bight 26 engaging against the interior of the finger engaging portion of the trigger 23 and its ends coiled about the pin 25, as may be observed in Figure 1.

The pins or shoes 13 and 14 are hardened for prolonged life.

The slots 22 in the plate structure C are slightly curved to compensate for the differences of radii between the pivot of the lever and the pivot of the link or bar 6, and the pivot of the lever with respect to the release pin 21.

The lever, as illustrated, operates as follows:

Figure 1 shows the parts with the lever member in "off" position. In view of the fact that there is always some brake pull imposed on the brake mechanism, by reason of the springs acting against the brake shoes within the drums, there is always some tension on the bar or link 6. This tension tends to move the brake lever B in the direction of brake pull thereby tilting the plate structure into frictional holding engagement with the bar or link 6 regardless of the position of the lever member B.

To set the brake the operator grasps the grip portion 4 swinging the lever in counterclockwise direction about its pivot 1. Such movement draws the bar or link 6 to the right, and, because of the loose suspension of the plate structure C, the plate structure is tilted slightly, permitting movement of the bar or link 6 between the shoes 13 and 14. During such movement of the lever member, the releasing pin 21 travels along the slot 22 in the plate structure. When the lever member B has been moved to desired position, the operator lets go of the grip portion of the lever member. Immediately brake pull tends to swing the lever member B to the left, that is, in clockwise direction. Such tendency to swing causes the tilting of the plate structure in clockwise direction, occasioned by engagement of the shoe 13 with the notch or recess 19 of the attaching bracket A thus tilting the plate structure in a direction to cause biting engagement of the shoes 13 and 14 with the opposite edges of the bar or link 6, thus holding the lever in adjusted position. When the plate structure is tilted as described, the pin 15 occupies an upper position in the slot 16 in the bracket A.

Figure 3 shows, in dotted lines, the position of the parts when the lever member is frictionally held in adjusted position, showing the shoes 13 and 14 in frictional engagement with the bar or link 6.

To release holding engagement of the plate structure with the bar or link 6, the trigger 23, actuated by the forefinger of the operator, moves inwardly, that is, in counterclockwise direction as viewed in Figure 1, which movement raises the releasing pin 21, thus raising the plate structure C, as shown in full lines in Figure 3. In this movement, the plate structure rocks about the engagement of the shoe 13 with the notch or recess 19, lowering the pin 15 in the slot 16, slightly. Such movement of the plate structure C moves the shoes 13 and 14 to full line position of Figure 3, that is, away from biting engagement with the opposite edges of the bar or link 6, thereby enabling return of the lever member B to "off" position. It is to be understood that during such return movement of the lever the trigger 23 remains depressed.

Figure 6 illustrates in full lines the positions of the parts as the lever member is returned to its full "off" position before the operator has released his finger pressure on the trigger 23. In the full line position of Figure 6, it will be observed that the plate structure C is tilted sharply, with its right-hand or tail end above its normal position, and with the pin 15 in the bottom of the slot 16, and with the shoe 13 against the notch or recess 19 of the bracket A. In this position the pin 21 of the releasing member is at the upper portion of its slots 20. With the parts in the full line position of Figure 6, movement of the lever member to the left, or in clockwise direction, is stopped by engagement of the pin 15 with a side wall of the slot 16. As soon as the operator releases his finger from the trigger 23, the spring 26 serves to project the trigger, lowering the releasing member 19 and the releasing pin 21, whereupon the brake pull tends to the left, as viewed in Figure 6, shifting the lever member B to dotted line position, the bar or link 6 to dotted line position and rocking the plate structure C about the point of engagement of the shoe 13 with the notch or recess 19, raising the shoe 13 into the notch and tilting the plate structure in clockwise direction and shifting the shoes 13 and 14 into frictional holding engagement with the bar or link 6.

If desired, the hangers 9 may be eliminated, in which event the structure would appear as shown in Figure 5, operating in all respects in the same manner as heretofore described.

It will be observed that the plate structure, or "canted link" is suspended from the attaching bracket A, and is not attached to the lever member B. The gripping or holding action is applied to the bar or link 6 which moves in a horizontal direction, or in straight line movement, with the brake mechanism connected to it.

When the hangers 9 are used, the bar or link 6 is restrained against any movement except endwise movement in horizontal direction although it swings through an arc from minimum, as shown in Figure 1, to maximum, as shown in Figure 4.

It will be observed that as the lever is moved in counterclockwise direction, that is, in a direction to set the brakes, the release leverage becomes greater so that at maximum load an increased leverage is available for releasing the brake.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

The invention is claimed as follows:

1. Brake lever construction comprising a mounting plate, a lever member pivoted to said plate to swing and depending from said plate, a link pivoted to said lever member at one end and at the other end connected to the brake mechanism, a tiltable plate structure having shoes adapted to frictionally engage opposite edges of said link, said plate structure being loosely suspended from said plate in unstable relation to allow tilting movement of said plate structure, said mounting plate and said plate structure having abutting means for causing said plate structure to tilt into holding engagement with said link as said lever member tends to move in direction of brake pull, and means on said lever member for tilting said plate structure to release it from holding engagement with said link.

2. An emergency brake lever construction for automotive vehicles comprising an attaching bracket, a lever member having bifurcated fulcrum ends pivoted to said bracket, a link pivoted at one end to said lever member and at the other end connected to the brake mechanism, a plate structure comprising plates astraddle said lever and bracket, shoes fixed to said plate structure with one shoe against one edge of said link and the other shoe against the opposite edge of said link, said plate structure having pin and slot connection to said bracket, said bracket having a margin formed with a shoulder against which the top shoe abuts as the plate structure is tilted or canted, the arrangement of the parts being such that brake pull tends to rock the plate structure with said shoulder as a center to cause said shoes to grip the link edges with biting holding action.

3. An emergency brake lever construction for automotive vehicles comprising an attaching bracket, a lever member having bifurcated fulcrum ends pivoted to said bracket, a link pivoted at one end to said lever member and at the other end connected to the brake mechanism, a plate structure comprising plates astraddle said lever and backet, shoes fixed to said plate structure with one shoe against one edge of said link and the other shoe against the opposite edge of said link, said plate structure having pin and slot connection to said bracket, said bracket having a margin formed with a shoulder against which the top shoe abuts as the plate structure is tilted or canted in one direction, releasing means carried by said lever member and engaged with said plate structure, the arrangement of the parts being such that brake pull tends to rock the plate structure about said shoulder as a center to cause said shoes to grip the link edges with biting holding engagement and actuation of said release member tends to tilt the plate structure in opposite direction about the shoulder as a center to disengage said shoes from holding engagement with said link.

4. An emergency brake lever construction for automotive vehicles comprising an attaching bracket, a lever member depending from said bracket and pivoted to it, a resistance member link connected at one end to said lever member, means suspended from said bracket and carrying shoes for making biting engagement with opposite edges of said link to hold it against movement by brake pull, and means carried by said lever member for tilting said first mentioned means to release said first mentioned means from holding engagement with said link.

5. An emergency brake lever construction for automotive vehicles comprising a bracket, a one-piece lever member of U-shaped cross section for a major portion of its length having bifurcated ends astraddle and pivoted to said bracket, a link pivoted at one end to said lever member adjacent said bracket and having its other end connected to the brake mechanism, a plate structure having spaced shoes astraddle said link arranged to frictionally engage the top and bottom edges of said link with holding action, said plate structure being suspended from said support in a manner to gravitationally tilt it in such direction as to cause said shoes to engage said link with holding action, a release member within said lever member and therein endwise movable, said release member having a pin and slot connection to said plate structure to actuate the same for shifting it to disengage said shoes from holding engagement with said link, and a trigger pivoted to said lever member adjacent its grip end and working in said slot and pivoted to one end of said release member for moving said release member to tilt said plate structure in the manner stated, and a spring acting against said trigger to normally maintain it in projected position.

6. A control mechanism comprising a fixed bracket, a lever member pivoted to said bracket, a resistance member including a link pivoted to said lever member, a plate structure straddling said bracket and lever member and loosely supported by said bracket and being provided with parts for frictionally engaging opposite edges of said link to hold said lever member in adjusted position, a release member on said lever member shiftable lengthwise thereof and having pin and slot connection with a portion of said plate structure, said bracket having a shoulder engageable by one of said plate parts and constituting a center of rock for said plate structure, the arrangement of the parts being such that under brake pull the plate structure tends to rock in one direction on said shoulder to cause biting engagement of said plate parts with said link to hold said lever in set position and on actuation of said release member said plate structure is rocked in the opposite direction to free holding engagement of said plate parts with said link to enable lever movement in opposite direction, said release member including a trigger adapted for forefinger operation.

7. The combination with a resistance member, of an attaching bracket, a lever member having bifurcated fulcrum ends astraddle and pivoted to said bracket, a link connected at one end of said lever between said bifurcations and at the other end to said resistance member, a plate structure loosely suspended from said bracket and having spaced bearing parts adapted to frictionally engage the top and bottom edges of said link, said bracket having a shoulder engageable by one of said bearing parts and serving as a center of tilt for said plate structure, said plate structure being tilted into frictional holding engagement with said link by tendency of said brake lever to move in accordance with brake pull thereby rocking said plate structure about said shoulder as a center.

8. An emergency brake lever construction for automotive vehicles comprising an attaching bracket, a lever member depending from said bracket and pivoted to it, a resistance member link connected at one end to said lever member, means suspended from said bracket and carrying shoes for making biting engagement with opposite edges of said link to hold it against movement by brake pull, said means being suspended in unbalanced relation and tending normally to swing in one direction to thereby move the shoes against the link edges, abutment means engaged by said first mentioned means as it swings to cause biting engagement of said shoes with said link, and means carried by said lever member for tilting said first mentioned means to release the same from holding engagement with said link.

HERBERT S. JANDUS.